United States Patent
Jeong et al.

(10) Patent No.: US 12,228,285 B2
(45) Date of Patent: Feb. 18, 2025

(54) COMBUSTOR NOZZLE AND GAS TURBINE INCLUDING THE SAME

(71) Applicant: DOOSAN ENERBILITY CO., LTD., Changwon-si (KR)

(72) Inventors: Han Jin Jeong, Hanam (KR); Seong Hwi Jo, Daejeon (KR); Chea Hong Choi, Gimhae (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/161,568

(22) Filed: Jan. 30, 2023

(65) Prior Publication Data
US 2023/0250957 A1     Aug. 10, 2023

(30) Foreign Application Priority Data

Feb. 7, 2022 (KR) .................. 10-2022-0015720

(51) Int. Cl.
| | |
|---|---|
| *F23R 3/28* | (2006.01) |
| *F02C 7/22* | (2006.01) |
| *F23D 14/62* | (2006.01) |
| *F23R 3/04* | (2006.01) |
| *F23R 3/14* | (2006.01) |

(52) U.S. Cl.
CPC .............. *F23R 3/286* (2013.01); *F02C 7/222* (2013.01); *F23R 3/045* (2013.01); *F23R 3/14* (2013.01); *F23D 14/62* (2013.01)

(58) Field of Classification Search
CPC ...... F23R 3/10; F23R 3/12; F23R 3/14; F23R 3/16; F23R 3/18; F23R 3/20; F23R 3/26; F23R 3/28; F23D 2900/00003; F23D 2900/10; F23D 2900/14701; F23D 14/82; F02C 7/22
See application file for complete search history.

(56) References Cited

U.S. PATENT DOCUMENTS

| | | | | |
|---|---|---|---|---|
| 5,498,155 A | * | 3/1996 | Chyou | F15D 1/0015 431/185 |
| 5,609,030 A | * | 3/1997 | Althaus | F23D 23/00 60/737 |
| 5,647,215 A | * | 7/1997 | Sharifi | F23D 17/002 239/431 |

(Continued)

FOREIGN PATENT DOCUMENTS

| | | |
|---|---|---|
| CN | 208237904 U | 12/2018 |
| JP | 2001254947 A | 9/2001 |

(Continued)

OTHER PUBLICATIONS

The KR Office Action, dated Jul. 20, 2023.

*Primary Examiner* — Stephanie Sebasco Cheng
*Assistant Examiner* — Jingchen Liu
(74) *Attorney, Agent, or Firm* — Harvest IP Law, LLP

(57) ABSTRACT

Disclosed herein is a combustor nozzle that includes at least one cluster composed of a plurality of tubes through which air and fuel flow, wherein the cluster includes a main tube through which air and fuel flow, a sub-tube disposed to surround the main tube, a fuel supply part positioned inside the main tube to supply fuel, and a plurality of wing parts protruding radially from the fuel supply part, each having one end coupled to the fuel supply part and the other end in contact with an inner peripheral surface of the main tube.

18 Claims, 10 Drawing Sheets

(56) References Cited

U.S. PATENT DOCUMENTS

| | | | | |
|---|---|---|---|---|
| 5,791,892 | A | * | 8/1998 | Dobbeling .............. F23D 14/62 431/284 |
| 8,490,398 | B2 | * | 7/2013 | Poyyapakkam .......... F23R 3/14 60/737 |
| 2010/0323309 | A1 | * | 12/2010 | Barkowski .............. F23R 3/286 431/278 |
| 2012/0198856 | A1 | | 8/2012 | Uhm |
| 2014/0109587 | A1 | * | 4/2014 | Crothers .................. F02C 7/24 60/725 |
| 2014/0238025 | A1 | * | 8/2014 | Uhm ....................... F23R 3/286 60/737 |
| 2017/0089582 | A1 | * | 3/2017 | Carrotte .................. F23R 3/16 |
| 2017/0108224 | A1 | * | 4/2017 | Beck ........................ F23R 3/36 |
| 2017/0198914 | A1 | * | 7/2017 | Baumann ............... F23R 3/343 |
| 2019/0264921 | A1 | * | 8/2019 | Doh ........................ F23C 7/004 |
| 2021/0088216 | A1 | | 3/2021 | Tada |
| 2023/0014495 | A1 | * | 1/2023 | Fukuba .................. F23D 14/64 |
| 2023/0151966 | A1 | * | 5/2023 | Dederichs .............. F23R 3/286 60/737 |

FOREIGN PATENT DOCUMENTS

| | | |
|---|---|---|
| JP | 2003148733 A | 5/2003 |
| JP | 2007147125 A | 6/2007 |
| JP | 3970244 B2 | 9/2007 |
| JP | 2010197039 A | 9/2010 |
| JP | 2011106805 A | 6/2011 |
| JP | 2013224659 A | 10/2013 |
| JP | 2014040999 A | 3/2014 |
| JP | 2014173837 A | 9/2014 |
| JP | 2019-533800 A | 11/2019 |
| JP | 3224436 U | 12/2019 |
| KR | 10-1625865 B1 | 5/2016 |
| KR | 20190040667 A | 4/2019 |
| KR | 20190048905 A | 5/2019 |
| KR | 20200003765 A | 1/2020 |
| KR | 102138015 B1 | 7/2020 |
| KR | 20210032753 A | 3/2021 |
| KR | 20220005294 A | 1/2022 |

* cited by examiner

COMBUSTOR NOZZLE AND GAS TURBINE INCLUDING THE SAME

CROSS-REFERENCE TO RELATED APPLICATION

This application claims priority to Korean Patent Application No(s). 10-2022-0015720, filed on Feb. 7, 2022, the disclosure of which is incorporated herein by reference in its entirety.

BACKGROUND

Technical Field

Exemplary embodiments relate to a combustor nozzle and a gas turbine including the same.

Related Art

Turbines are machines that obtain a rotational force by impingement or reaction force using the flow of a compressible fluid such as steam or gas, and include a steam turbine using steam, a gas turbine using hot combustion gas, and so on.

The gas turbine is a power engine that mixes air compressed by a compressor with fuel for combustion and rotates a turbine with hot gas produced by the combustion. The gas turbine is used to drive a generator, an aircraft, a ship, a train, etc.

The gas turbine typically includes a compressor, a combustor, and a turbine. The compressor sucks and compresses outside air, and then transmits the compressed air to the combustor. The air compressed by the compressor becomes high pressure and high temperature. The combustor mixes the compressed air flowing thereinto from the compressor with fuel and burns a mixture thereof. The combustion gas produced by the combustion is discharged to the turbine. Turbine blades in the turbine are rotated by the combustion gas, thereby generating power. The generated power is used in various fields, such as generating electric power and actuating machines.

Fuel is injected through nozzles installed in each combustor section of the combustor, and the nozzles allow for injection of gas fuel and liquid fuel. In recent years, it is recommended to use hydrogen fuel or fuel containing hydrogen to inhibit the emission of carbon dioxide.

Fuel mixing is a challenge because it is difficult to match concentric circles when fuel is supplied through a simple tube in the combustor of the gas turbine. In addition, hydrogen has a high combustion rate and a high temperature. Hence, when supply of hydrogen fuel is biased in one direction, flashback may occur, resulting in damage to the combustor.

SUMMARY

Aspects of one or more exemplary embodiments provide a combustor nozzle that includes a plurality of wing parts protruding radially from a fuel supply part to supply fuel to a center of a tube, and a gas turbine including the same.

Additional aspects will be set forth in part in the description which follows and, in part, will become apparent from the description, or may be learned by practice of the exemplary embodiments.

According to an aspect of an exemplary embodiment, there is provided a combustor nozzle that includes at least one cluster composed of a plurality of tubes through which air and fuel flow, wherein the cluster includes a main tube through which air and fuel flow, a sub-tube disposed to surround the main tube, a fuel supply part positioned inside the main tube to supply fuel, and a plurality of wing parts protruding radially from the fuel supply part, each having one end coupled to the fuel supply part and the other end in contact with an inner peripheral surface of the main tube.

The wing parts may be spaced apart from each other at the same angle around the fuel supply part.

The wing parts may be four or five in number.

All of the wing parts may have the same length.

Each of the wing parts may have a length that is equal to or greater than a minimum length from an outer peripheral surface of the fuel supply part to the inner peripheral surface of the main tube.

Each of the wing parts may have a smaller height than the main tube.

The fuel supply part may be positioned in the center of the main tube.

Each of the wing parts may have a thickness that is greater at a second position closer to the end of the fuel supply part than at a first position in a direction of extension of the fuel supply part.

The wing parts may be closer to an outlet than an inlet of the main tube into which air and fuel are introduced.

The wing parts may be closer to an inlet than an outlet of the main tube from which air and fuel are discharged.

According to an aspect of another exemplary embodiment, there is provided a gas turbine that includes a compressor configured to compress air introduced thereinto from the outside, a combustor configured to mix fuel with the air compressed by the compressor for combustion, and a turbine having a plurality of turbine blades rotated by combustion gas produced by the combustion in the combustor. The combustor includes a combustor nozzle including at least one cluster composed of a plurality of tubes through which air and fuel flow. The cluster includes a main tube through which air and fuel flow, a sub-tube disposed to surround the main tube, a fuel supply part positioned inside the main tube to supply fuel, and a plurality of wing parts protruding radially from the fuel supply part, each having one end coupled to the fuel supply part and the other end in contact with an inner peripheral surface of the main tube.

The wing parts may be spaced apart from each other at the same angle around the fuel supply part.

The wing parts may be four or five in number.

All of the wing parts may have the same length.

Each of the wing parts may have a length that is equal to or greater than a minimum length from an outer peripheral surface of the fuel supply part to the inner peripheral surface of the main tube.

Each of the wing parts may have a smaller height than the main tube.

The fuel supply part may be positioned in the center of the main tube.

Each of the wing parts may have a thickness that is greater at a second position closer to the end of the fuel supply part than at a first position in a direction of extension of the fuel supply part.

The wing parts may be closer to an outlet than an inlet of the main tube into which air and fuel are introduced.

The wing parts may be closer to an inlet than an outlet of the main tube from which air and fuel are discharged.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
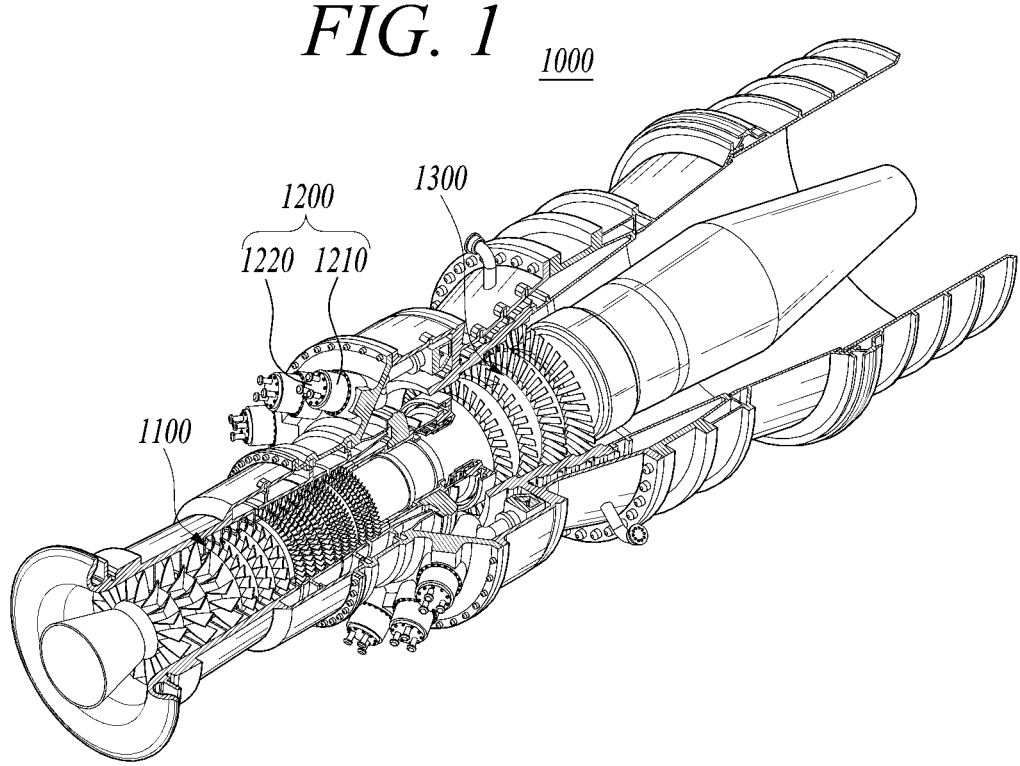
FIG. 1 is a view illustrating an interior of a gas turbine according to a first exemplary embodiment.

Various modifications and different embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

Hereinafter, a gas turbine according to a first exemplary embodiment will be described.

Figure 2:
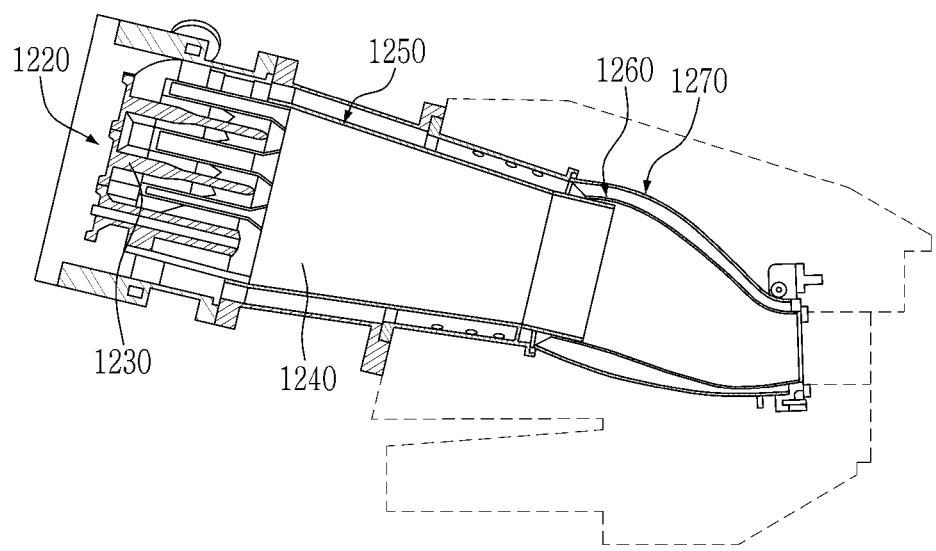
FIG. 2 is a longitudinal cross-sectional view illustrating the combustor of FIG. 1.

FIG. 1 is a view illustrating the interior of the gas turbine according to the first exemplary embodiment. FIG. 2 is a longitudinal cross-sectional view illustrating the combustor of FIG. 1.

The thermodynamic cycle of the gas turbine, which is designated by reference numeral 1000, according to the present embodiment may ideally follow a Brayton cycle. The Brayton cycle may consist of four phases including isentropic compression (adiabatic compression), isobaric heat addition, isentropic expansion (adiabatic expansion), and isobaric heat dissipation. In other words, in the Brayton cycle, thermal energy may be released by combustion of fuel in an isobaric environment after the atmospheric air is sucked and compressed to a high pressure, hot combustion gas may be expanded to be converted into kinetic energy, and exhaust gas with residual energy may then be discharged to the atmosphere. The Brayton cycle may consist of four processes, i.e., compression, heating, expansion, and exhaust.

The gas turbine 1000 using the above Brayton cycle may include a compressor 1100, a combustor 1200, and a turbine 1300, as illustrated in FIG. 1. Although the following description is given with reference to FIG. 1, the present disclosure may be widely applied to a turbine engine having the same configuration as the gas turbine 1000 exemplarily illustrated in FIG. 1.

Referring to FIGS. 1 and 2, the compressor 1100 of the gas turbine 1000 may suck air introduced from the outside and compress the air. The compressor 1100 may supply the combustor 1200 with the air compressed by compressor blades and may supply cooling air to a hot region required for cooling in the gas turbine 1000. In this case, since the air sucked into the compressor 1100 is subject to an adiabatic compression process therein, the pressure and temperature of the air that has passed through the compressor 1100 increase.

The compressor 1100 is designed as a centrifugal compressor or an axial compressor. In general, the centrifugal compressor is applied to a small gas turbine, whereas the multistage axial compressor 1100 is applied to the large gas turbine 1000 as illustrated in FIG. 1 because it is necessary to compress a large amount of air.

The compressor 1100 is driven by some of the power output from the turbine 1300. To this end, the rotary shaft of the compressor 1100 is directly connected to the rotary shaft of the turbine 1300, as illustrated in FIG. 1. In the large gas turbine 1000, the compressor 1100 requires almost half of the power generated by the turbine 1300 for driving. Accordingly, the overall efficiency of the gas turbine 1000 can be enhanced by directly increasing the efficiency of the compressor 1100.

Meanwhile, the combustor 1200 may mix the compressed air, which is supplied from the outlet of the compressor 1100, with fuel for isobaric combustion to produce combustion gas with high energy. The combustor 1200 mixes fuel with the compressed air introduced thereinto and burns a mixture thereof to produce high-temperature and high-pressure combustion gas with high energy. The combustor 1200 increases the temperature of the combustion gas to a heat-resistant limit of combustor and turbine components through an isobaric combustion process.

The combustor 1200 may consist of a plurality of combustors arranged in a combustor casing in the form of a shell. Each of the combustors includes a burner having a fuel injection nozzle and the like, a combustor liner defining a combustion chamber, and a transition piece serving as the connection between the combustor and the turbine.

The combustor 1200 may have a plurality of burners 1220 disposed along the annular combustor casing 1210 downstream of the compressor 1100. Each of the burners 1220 includes a plurality of nozzles 1230, and the fuel injected from the nozzles 1230 is mixed with air at an appropriate rate so that the mixture thereof is suitable for combustion. The fuel injected from the nozzles 1230 is mixed with compressed air and then enters a combustion chamber 1240.

The combustor 1200 needs to be properly cooled because it is under the highest temperature environment in the gas turbine 1000. Referring to FIGS. 1 and 2, compressed air is supplied to the nozzles 1230 along the outer surface of a duct assembly composed of a liner 1250, a transition piece 1260, and a flow sleeve 1270, wherein the duct assembly connects an associated one of the burners 1220 to the turbine 1300 so that hot combustion gas flows through the duct assembly. In this process, the duct assembly heated by the hot combustion gas is properly cooled.

The combustor 1200 may include a cluster 1500 composed of a plurality of tubes through which air and fuel flow.

The high-temperature and high-pressure combustion gas produced by the combustor 1200 is supplied to the turbine 1300 through the duct assembly.

The turbine 1300 may include a plurality of turbine blades rotated by combustion gas produced by the combustion in the combustor 1200. In the turbine 1300, the combustion gas applies impingement or reaction force to the turbine blades radially disposed on the rotary shaft of the turbine 1300 while expanding adiabatically, so that the thermal energy of the combustion gas is converted into mechanical energy for rotating the rotary shaft. Some of the mechanical energy obtained from the turbine 1300 is supplied as energy required to compress air in the compressor, and the rest is utilized as effective energy, such as for driving the power generator to generate electric power.

Hereinafter, one combustor nozzle 1230 according to the first exemplary embodiment will be described. The combustor nozzle 1230 and nozzle 1230 are interchangeably used throughout this specification.

Figure 3:
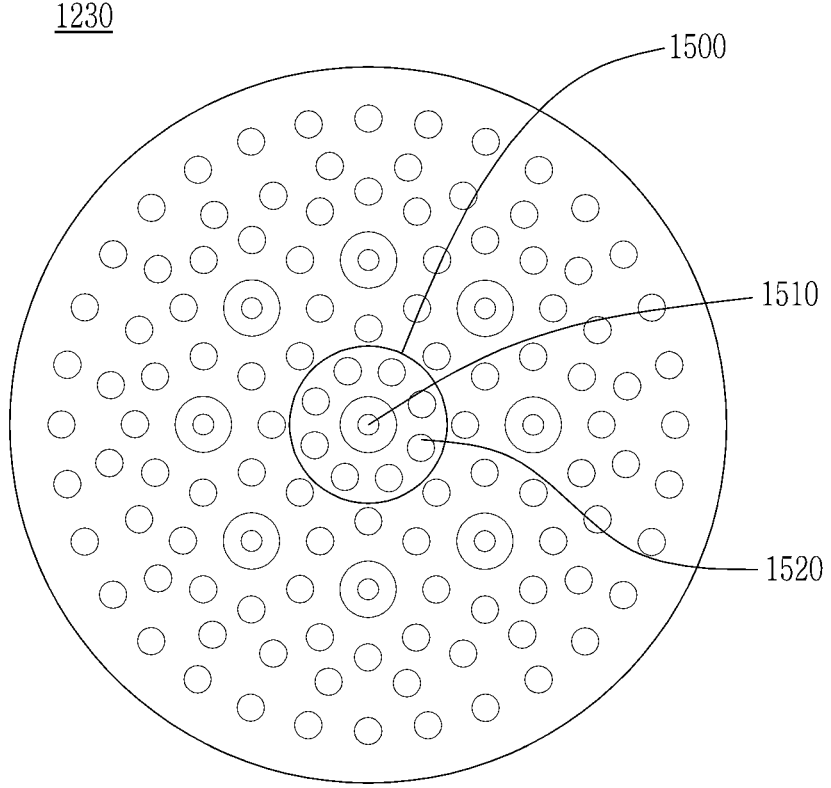
FIG. 3 is a cross-sectional view illustrating one combustor nozzle of FIG. 2.
Figure 4:
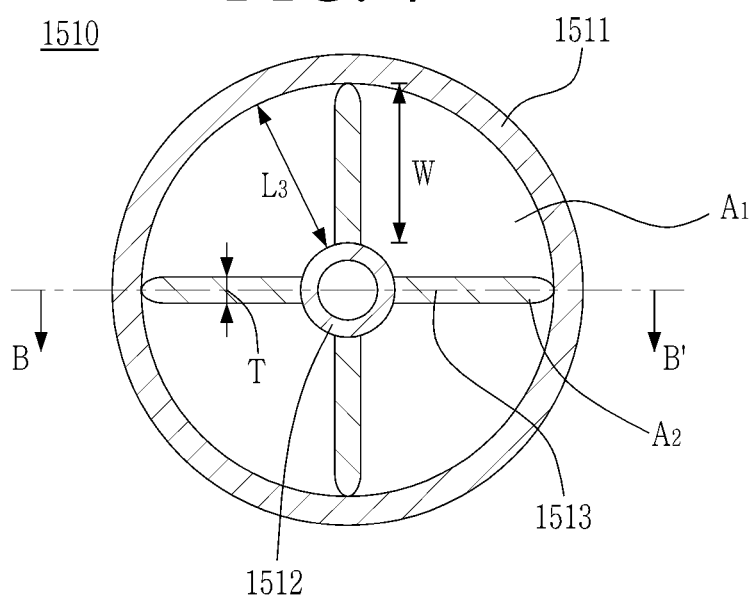
FIG. 4 is an enlarged view illustrating the main tube of FIG. 3.
Figure 5:
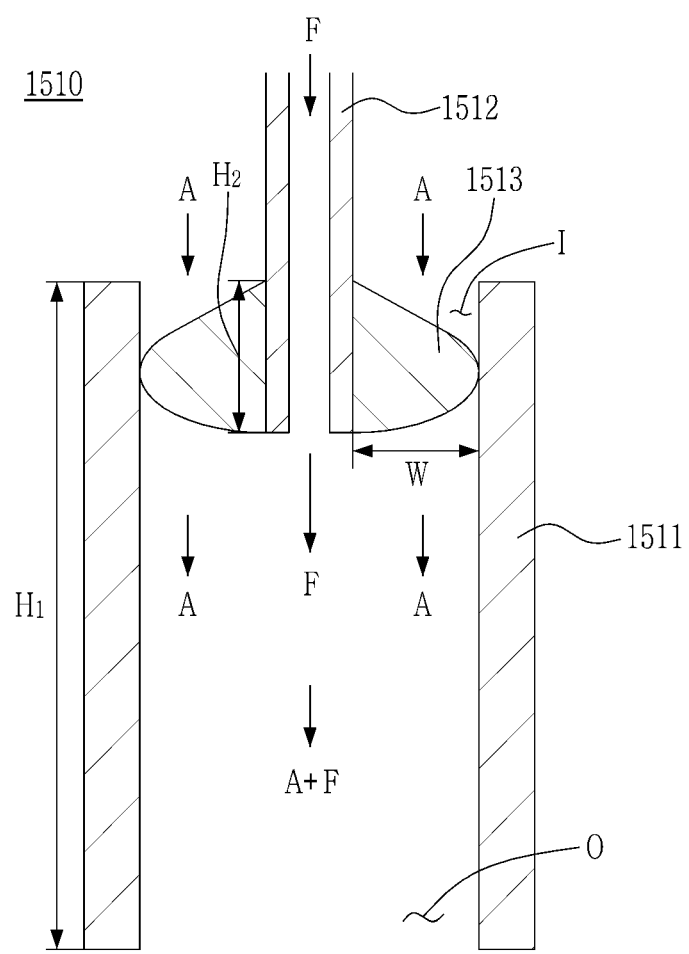
FIG. 5 is a cross-sectional view taken along line B-B' of FIG. 4.
Figure 6:
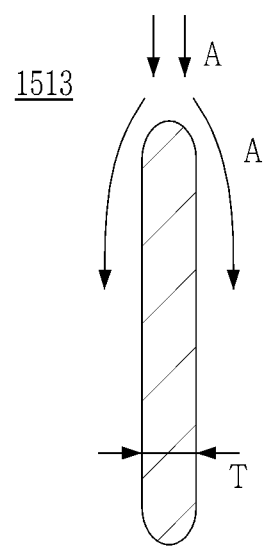
FIG. 6 is a view illustrating a shape of one wing part of FIG. 5 and the resulting of fluid.

FIG. 3 is a cross-sectional view illustrating the combustor nozzle of FIG. 2. FIG. 4 is an enlarged view illustrating the main tube of FIG. 3. FIG. 5 is a cross-sectional view taken along line B-B' of FIG. 4. FIG. 6 is a view illustrating the shape of one wing part of FIG. 5 and the resulting of fluid.

Referring to FIGS. 3 to 6, the combustor nozzle 1230 according to the first exemplary embodiment may include at least one cluster 1500 composed of a plurality of tubes through which air and fuel flow. The combustor nozzle 1230 may be configured such that one cluster 1500 is positioned in the center thereof and other clusters 1500 surround the central cluster 1500 (see FIG. 3).

Each cluster 1500 may include a main tube 1510, a sub-tube 1520, a fuel supply part 1512, and wing parts 1513. Here, it may be understood by those skilled in the art that other general-purpose components or common components other than the components illustrated in FIGS. 3 to 6 are omitted from the depictions of FIGS. 3 to 6 and may be further included in the cluster 1500.

The main tube 1510 may include an outer wall 1511. The main tube 1510 may act as a passage through which air and fuel may flow. According to an embodiment, the main tube 1510 may be positioned in the center of the cluster 1500. However, in another embodiment, the main tube 1510 may be positioned off-center of the cluster 1500. When the main tube 1510 is positioned eccentrically, the phase difference thereof will offset amplitudes caused by combustion of fuel, resulting in a reduction in generation of vibration due to the combustion.

The outer wall 1511 may have a tubular shape with an internal space through which air and fuel may flow. The outer wall 1511 may have a tubular shape with a sufficient diameter to form the fuel supply part 1512 and the wing parts 1513 therein. The outer wall 1511 may be made of a heat-resistant material enough to withstand high temperature to prevent damage from flashback of fuel.

The sub-tube 1520 may consist of one or more sub-tubes surrounding the main tube 1510. As with the main tube 1510, the sub-tubes 1520 may each act as a passage through which air and fuel may flow. The sub-tubes 1520 may be positioned outside the center of the cluster 1500 (see FIG. 3). The sub tubes 1520 may be disposed at the same central angle from the center of the main tube 1510. The sub tubes 1520 may be disposed at the same distance away or spaced apart from the center of the main tube 1510.

The fuel supply part 1512 may be positioned inside the main tube 1510 for supply of fuel. The fuel supply part 1512 may have a tubular shape with an internal space through which fuel may flow. The fuel supply part 1512 may be positioned in the center of the main tune 1510. When the fuel supply part 1512 is positioned in the center of the main tube 1510, it is possible to prevent the fuel in the main tube 1510 from being biased to one side. This can prevent damage to the combustor 1200 due to flashback.

Since the fuel supply part 1512 supplies fuel to the main tube 1510 independently of each sub-tube 1520, the equivalence ratios of fuel injected from the main tube 1510 and the sub-tube 1520 may be different.

In the case where fuel is supplied to the main tube 1510 and the sub-tube 1520 in premixed combustion in which fuel and air are mixed in advance and supplied to the burner 1220, the fuel supply part 1512 may additionally supply fuel to the premixed mixture supplied to the main tube 1510, thereby enabling high equivalent fuel to be injected from the main tube 1510.

If the combustor 1200 is operated by combustion of the low equivalent fuel injected from the sub-tube 1520, the flame temperature thereof may be low due to the low equivalence ratio. As a result, unburned fuel such as unburned hydrocarbon (UHC) or carbon monoxide may be produced, and combustion vibration may occur depending on the instability of the flame. In this case, the flame temperature or the combustion vibration may be adjusted by additionally supplying high equivalent fuel from the main tube 1510.

In addition, according to an embodiment, the main tube 1510 may act as a pilot burner that supplies high equivalent fuel to initially start the combustor 1200.

According to an embodiment, the main tube 1510 may include multiple wing parts 1513, for example, four (4) wing parts 1513. Air may be introduced into an inlet of the main tube 1510, other than the fuel supply part 1512, and flow between the multiple wing parts 1513, and be mixed with the fuel discharged from the fuel supply part 1512. Each wing part 1513 may protrude radially from the fuel supply part 1512, and have one end, i.e., the radially inward end, coupled to the fuel supply part 1512 and the other end, i.e., the radially outward end, in contact with the inner peripheral surface of the main tube 1510 (see FIG. 4). The radially outward ends of the wing parts 1513 may be supported by the inner peripheral surface of the main tube 1510. Thereby, the plurality of wing parts 1513 may allow the fuel supply part 1512 to be fixed at a constant position in the main tube 1510.

That is, the wing parts 1513 are coupled to the fuel supply part 1512 and are in contact with the inner peripheral surface of the main tube 1510. Therefore, the wing parts 1513 may act as fixtures for fixing the fuel supply part 1512 so as not to move. This allows the fuel supply part 1512 to supply fuel at a certain position in the main tube 1510 despite combustion vibration, thereby ensuring a constant mixing ratio of fuel to achieve combustion stability.

The wing parts 1513 may maintain the fuel supply part 1512 at a constant position despite combustion vibration, so as to supply fuel to a certain position or toward a constant or fixed position in the main tube 1510.

According to an embodiment, the wing parts 1513 may be spaced apart from each other at the same angle around the fuel supply part 1512. If the wing parts 1513 are spaced apart from each other at different angles, the fuel supply part 1512 may be displaced to a region where the wing parts 1513 are not positioned. Therefore, the wing parts 1513 must be spaced apart from each other at the same angle to efficiently fix the fuel supply part 1512 at a constant position in the main tube 1510.

For example, four wing parts 1513 may be spaced apart from each other at an angle of 90° (see FIG. 4). If the number of wing parts 1513 is large, the fuel supply part 1512 is stably fixed, but the ratio of the area A2 occupied by the wing parts 1513 to the inner area A1 of the main tube 1510 may be too large. Accordingly, the number and arrangement of the wing parts 1513 should be determined so as not to interfere with the flow of fluid in the main tube 1510.

According to an embodiment, the wing parts 1513 may each have a thin thickness T in order not to interfere with the flow of fluid in the main tube 1510. Thus, the ratio of the area A2 occupied by the wing parts 1513 to the area A1 of the main tube 1510 may be low enough to allow the fluid in the main tube 1510 to flow smoothly.

According to an embodiment, the plurality of wing part 1513 may have the same length. Here, the wing parts 1513 may each have a length W extending radially from the fuel supply part 1512 to the inner peripheral surface of the main tube 1510. When all of the wing parts 1513 have the same length W, the fuel supply part 1512 may be fixed at the center of the main tube 1510. However, the lengths of the wing parts 1513 are not limited thereto. For example, if the fuel supply part 1512 needs to be fixed at an off-center position of the main tube 1510, the wing parts 1513 may be configured to have different lengths.

As described above, when the fuel supply part 1512 is fixed in the center of the main tube 1510 by virtue of the same length of the wing parts 1513, it is possible to prevent the fuel in the main tube 1510 from being biased in one direction from the center of the main tube 1510. This can prevent damage to the combustor 1200 due to flashback. In addition, since fuel is supplied to the center of the main tube 1510, it is possible to smoothly mix fuel and air.

According to an embodiment, the length W of each wing part 1513 may be equal to or greater than the minimum length L3 from the outer peripheral surface of the fuel supply part 1512 to the inner peripheral surface of the main tube 1510. If the length W of the wing part 1513 is smaller than the minimum length L3 from the outer peripheral surface of the fuel supply part 1512 to the inner peripheral surface of the main tube 1510, a gap may be formed between the end of the wing part 1513 and the inner peripheral surface of the main tube 1510. In this case, if combustion vibration occurs due to the operation of the gas turbine 1000, the fuel supply part 1512 coupled to the wing part 1513 may move and be displaced by the gap.

According to an embodiment, when the fuel supply part 1512 is positioned in the center of the main tube 1510, the length W of the wing part 1513 may be equal to the minimum length L3 from the outer peripheral surface of the fuel supply part 1512 to the inner peripheral surface of the main tube 1510. On the other hand, according to an embodiment, when the fuel supply part 1512 is positioned off-center of the main tube 1510, the length W of the wing part 1513 may be greater than the minimum length L3 from the outer peripheral surface of the fuel supply part 1512 to the inner peripheral surface of the main tube 1510. According to an embodiment, when the fuel supply part 1512 is positioned off-center of the main tube 1510, a length of one wing part 1513 (i.e., a first wing part) may be different to a length of another wing part 1513 (i.e., a second wing part). In other words, a length of each one of the wing parts 1513 may be the same to a radial distance from a position of the outer peripheral surface of the fuel supply part 1512 to a position of the inner peripheral surface of the outer wall 1511 where the each one of the wing parts 1513 is to be disposed, so that the fuel supply part 1512 is maintained at its constant position by being supported by the wing parts 1513.

According to an embodiment, the wing part 1513 may have a height H2 smaller than the height H1 of the main tube 1510 (i.e., an axial length of the main tube 1510) (see FIG. 5). The height H2 of the wing part 1513 may be measured in an axial direction from the upstream end of the protrusion of the wing part 1513 to the downstream end of the protrusion of the wing part 1513 according to the flow direction of the fuel in the main tube 1510. If the height H2 of the wing part 1513 is greater than the height H1 of the main tube 1510, a portion of the wing part 1513 may protrude outward in the axial direction from the inlet or outlet of the main tube 1510.

If a portion of the wing part 1513 protrudes axially outward from the inlet of the main tube 1510, a fluid may be prevented or hindered from flowing into the main tube 1510. If a portion of the wing part 1513 protrudes axially outward from the outlet of the main tube 1510, the wing part 1513 may be damaged due to high temperature because the wing part 1513 is positioned adjacent to the combustion chamber 1240 where the actual fuel is burned.

Moreover, if the height H2 of each wing part 1513 is too large, the direction of flow of fluid between the wing parts 1513 may be restricted. In addition, the wing parts 1513 can prevent a collision between fluids flowing in the main tube 1510. Hence, if the height H2 of each wing part 1513 is too large, recirculation due to the collision between fluids in the main tube 1510 is not performed, resulting in insufficient mixing of air and fuel.

According to an embodiment, the wing part 1513 may be closer to the inlet I than the outlet O of the main tube 1510 from which air and fuel are discharged (see FIG. 5). In other words, the length from the inlet I to the upstream end of the wing part 1513 may be shorter than the length from the downstream end of the wing part 1513 to the outlet O. As the wing part 1513 is formed at a position closer to the inlet I than to the outlet O, the distance that the fluid having passed through the wing part 1513 flows to the outlet O may increase. Thereby, a path is lengthened in which the collision and mixing of flowing fluids may occur, and therefore, air and fuel may be sufficiently mixed.

According to an embodiment, the wing part 1513 may have a gently curved edge at the upstream end so as not to interfere with the flow of fluid in the main tube 1510 (see FIG. 6). That is, making the edge of the wing part 1513 gentle can minimize friction between the wing part 1513 and the fluid.

Hereinafter, one combustor nozzle 1230 according to a second exemplary embodiment will be described.

Figure 7:
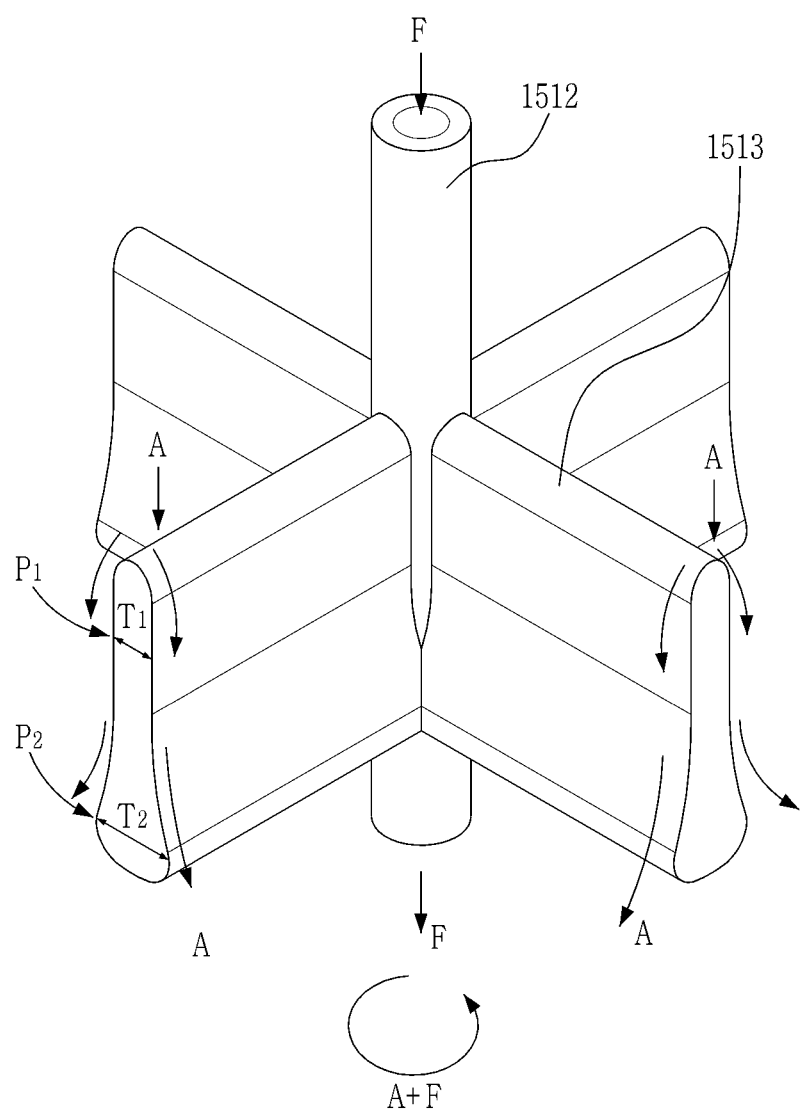
FIG. 7 is a perspective view illustrating a fuel supply part and wing parts according to a second exemplary embodiment.
Figure 8:
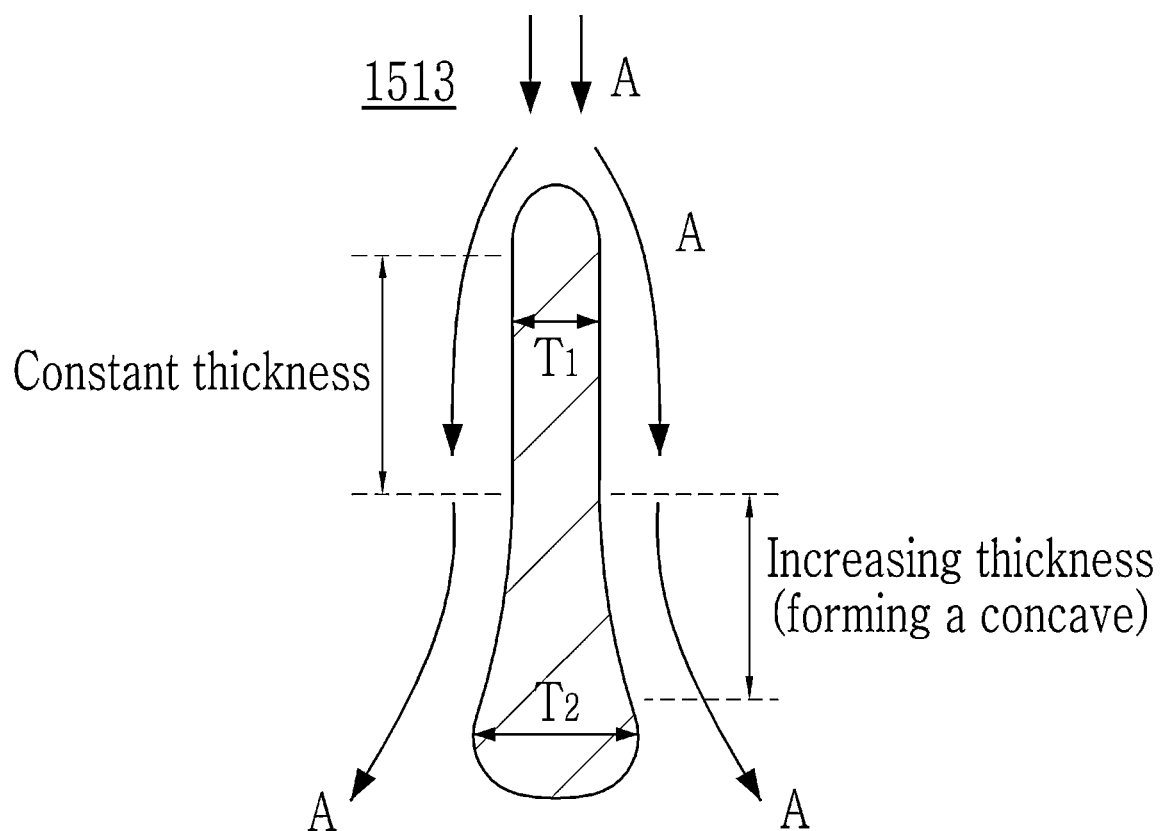
FIG. 8 is a view illustrating a shape of one wing part of FIG. 7 and the resulting flow of fluid.

FIG. 7 is a perspective view illustrating a fuel supply part and wing parts according to the second exemplary embodiment. FIG. 8 is a view illustrating a shape of one wing part of FIG. 7 and the resulting flow of fluid.

Referring to FIGS. 7 and 8, since the combustor nozzle 1230 according to the second exemplary embodiment has the same structure as the combustor nozzle 1230 according to the first exemplary embodiment, except for the shape of each wing part 1513, a redundant description thereof will be omitted.

According to the present embodiment, the wing part 1513 may have thicknesses T1 and T2. The position where the thickness T1 is measured is located more upstream than the position where the thickness T2 is measured. According to an embodiment, T2 measured at a second position P2 is greater than T1 measured at a first position P1. That is, as illustrated in FIG. 7, the wing part 1513 may have a gently curved edge, and may be shaped such that the second thickness T2 at the second position P2 close to the end of the fuel supply part 1512 is greater than the first thickness T1 at the first position P1. According to an embodiment, while T1 and T2 are thickness of the wing part 1513 and measured in a circumferential direction, T1 is measured at a position relatively more upstream than a position where T2 is measured. Since each wing part 1513 becomes thicker along the flow direction of fluid (e.g., from T1 to T2), the flow of the fluid adjacent to that wing part 1513 may spread outward of that wing part 1513 (see FIG. 8). This can prevent the direction of flow of the fluid between the wing parts 1513 from being restricted in the axial direction, which is parallel to the direction of extension of the fuel supply part 1512.

As such, since the direction of flow of the fluid adjacent to each wing part 1513 spreads outward of that wing part 1513, the fluids flowing between the wing parts 1513 may collide with each other, rather than only flowing in parallel in the axial direction. Thereby, the fluids flowing between the wing parts 1513 may be recirculated by mutual collision, which can lead to smooth mixing.

In addition, since the path of the fluid flowing between the wing parts 1513 is not restricted to the axial direction due to the shape of the wing part 1513 as described above, the mixing of the air flowing between the wing parts 1513 with the fuel injected from the downstream end of the fuel supply part 1512 can be smoothly performed.

Hereinafter, one combustor nozzle 1230 according to a third exemplary embodiment will be described.

Figure 9:
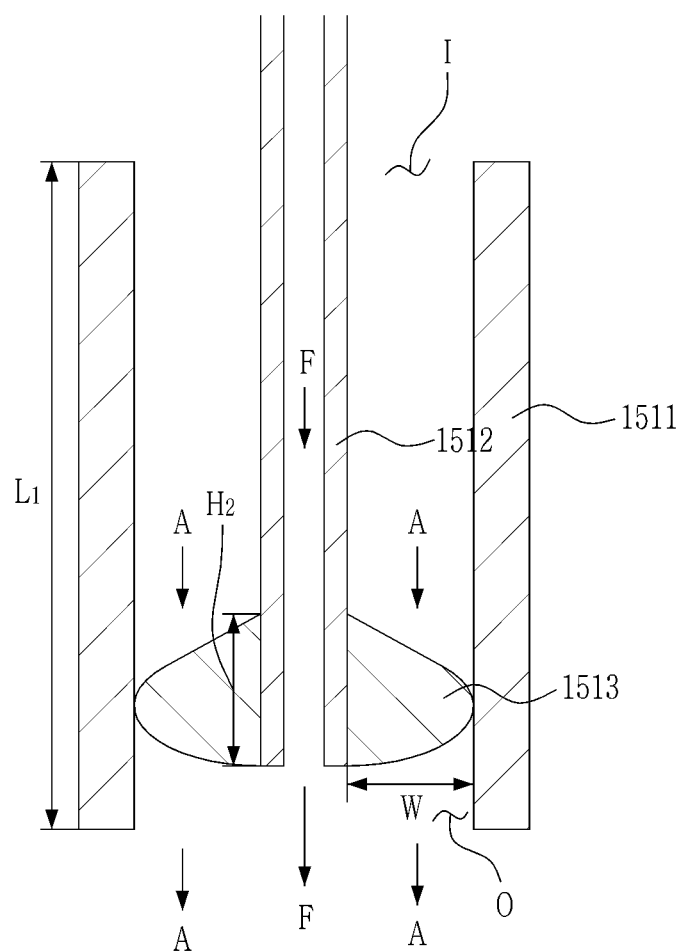
FIG. 9 is a cross-sectional view illustrating a fuel supply part and wing parts according to a third exemplary embodiment.

FIG. 9 is a cross-sectional view illustrating a fuel supply part and wing parts according to the third exemplary embodiment.

Referring to FIG. 9, since the combustor nozzle 1230 according to the third exemplary embodiment has the same structure as the combustor nozzle 1230 according to the first exemplary embodiment, except for the position of each wing part 1513, a redundant description thereof will be omitted.

According to the present embodiment, each wing part 1513 may be closer to the outlet O than the inlet I of the main tube 1510 into which air and fuel are introduced. In other words, the length from the inlet I to the upstream end of the wing parts 1513 may be longer than the length from the downstream end of the wing part 1513 to the outlet. As the wing part 1513 is formed at a position closer to the outlet O, the distance that the fluid having passed through the wing part 1513 flows to the outlet O may decrease. This means that a path is shortened in which the collision and mixing of flowing fluids may occur, and therefore, air and fuel may not be sufficiently mixed.

As such, when air and fuel injected through the main tube 1510 are not sufficiently mixed, they may be injected out of the main tube 1510 in a high equivalence ratio. When high equivalent fuel is supplied to the combustion chamber 1240, it is possible to increase low flame temperature and flame stability by the combustion of uniformly mixed and low equivalent fuel.

On the other hand, when low equivalent fuel is burned, unburned fuel may be produced due to low flame temperature, resulting in carbon monoxide due to incomplete combustion. In addition, the low fuel content may cause combustion vibration due to flame instability, which may cause a problem with the overall structural stability of the combustor 1200.

As such, the fuel injected from the main tube 1510 according to the present embodiment has a high equivalence ratio. Therefore, when combustion vibration occurs or unburned fuel is produced depending on the combustion state of the fuel, it can be adjusted by increasing the amount of fuel supplied to the main tube 1510.

Hereinafter, one combustor nozzle 1230 according to a fourth exemplary embodiment will be described.

Figure 10:
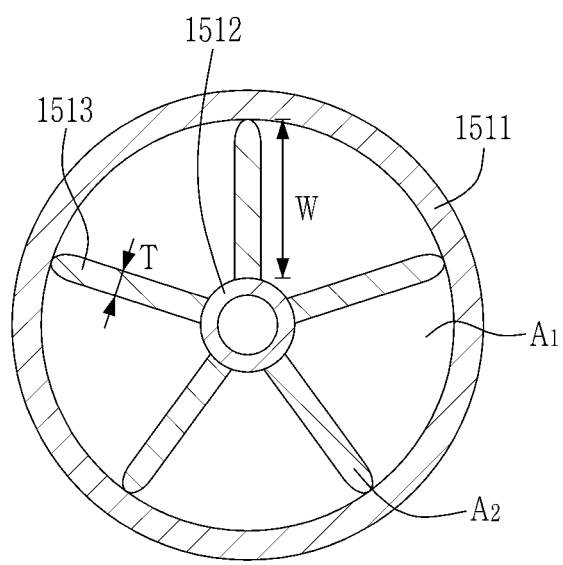
FIG. 10 is a cross-sectional view illustrating a main tube according to a fourth exemplary embodiment.

FIG. 10 is a cross-sectional view illustrating a main tube according to the fourth exemplary embodiment.

Referring to FIG. 10, since the combustor nozzle 1230 according to the fourth exemplary embodiment has the same structure as the combustor nozzle 1230 according to the first exemplary embodiment, except for the number and arrangement of wing parts 1513, a redundant description thereof will be omitted.

According to an embodiment, the main tube 1510 may include five wing parts 1513. The five wing parts 1513 according to the present embodiment may be spaced apart from each other at a same angle, which is an angle of 72°. Compared to the case where the number of wing parts 1513 is 4, the fuel supply part 1512 may be fixed in multiple directions. Thus, the fuel supply part 1512 may be more stably fixed at a constant position in the main tube 1510 in all directions.

However, as the number of wing parts 1513 increases, the flow of fluid in the main tube 1510 may be hindered. Accordingly, the shape of each wing part 1513 may be adjusted so that the ratio of the area occupied by the wing parts 1513 to the inner area of the main tube 1510 does not become too large. The thickness T of each wing part 1513 may be adjusted so that the ratio of the area occupied by the wing parts 1513 to the inner area of the main tube 1510 is maintained the same as that when there are four wing parts 1513.

As is apparent from the above description, the combustor nozzle and the gas turbine including the same can supply fuel to the center of the tube to facilitate fuel mixing and to prevent the supply of fuel to one side only.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims. Also, it is noted that any one feature of an embodiment of the present disclosure described in the specification may be applied to another embodiment of the present disclosure.

What is claimed is:

1. A combustor nozzle comprising:
at least one cluster composed of a plurality of tubes, wherein each of the at least one cluster comprises:
a main tube, from among the plurality of tubes, through which air and fuel flow, the main tube having an axial height and defining an axial direction from upstream to downstream according to a flow direction of the air and the fuel through the main tube;
a plurality of sub-tubes, from among the plurality of tubes, arranged with a circumferential pattern to form a circumference, wherein the main tube is located at a center of the circumference;
a fuel supply part including a fuel conduit extending parallel to the axial direction and a plurality of wing parts radially protruding from the fuel conduit;
wherein, for each of the at least one cluster, at least a portion of the fuel conduit is positioned inside the main tube to supply the fuel,
wherein a total count of the fuel supply part in each of the at least one cluster is one,
wherein, for each of the at least one cluster, each of the plurality of wing parts has a radially inward end that is coupled to the fuel conduit and a radially outward end that is in contact with an inner peripheral surface of the main tube,
wherein, for each of the at least one cluster, each of the plurality of wing parts has an upstream half portion and a downstream half portion,
wherein, for each of the plurality of wing parts in each of the at least one cluster, an upstream end corner of the upstream half portion and a downstream end corner of the downstream half portion are formed round,
wherein, for each of the plurality of wing parts in each of the at least one cluster, a thickness of the upstream half portion is defined in a circumferential direction about the fuel conduit and comprises a first maximum thickness T1, and the first maximum thickness T1 remains constant for a height of the upstream half portion in the axial direction,
wherein, for each of the plurality of wing parts in each of the at least one cluster, a thickness of the downstream half portion is defined in the circumferential direction and the thickness gradually increases from upstream to downstream over a height of the downstream half portion in the axial direction, such that a concavely curved surface is formed on an outer circumferentially facing surface of the downstream half portion,
wherein, for each of the plurality of wing parts in each of the at least one cluster, the first maximum thickness T1 of the upstream half portion occurs at a first axial location P1, the thickness of the downstream half portion comprises a second maximum thickness T2 at a second axial location P2, and the first maximum thickness T1 is smaller than the second maximum thickness T2, such that, at the first axial location P1, the radially inward end of each wing part of the plurality of wing parts is spaced apart in the circumferential direction from the radially inward end of an adjacent wing part of the plurality of wing parts, and at the second axial location P2, the radially inward end of each wing part of the plurality of wing parts is in contact with the radially inward end of the adjacent wing part of the plurality of wing parts in the circumferential direction.

2. The combustor nozzle according to claim 1, wherein, for each of the at least one cluster, at the first axial location P1, the radially inward end of each of the plurality of wing parts is spaced apart from the radially inward end of the adjacent wing part of the plurality of wing parts with a same angle in the circumferential direction around the fuel conduit.

3. The combustor nozzle according to claim 2, wherein, for each of the at least one cluster, the plurality of wing parts are four or five in number.

4. The combustor nozzle according to claim 1, wherein, for each of the at least one cluster, each of the plurality of wing parts has a same length from the radially inward end to the radially outward end.

5. The combustor nozzle according to claim 1, wherein, for each of the at least one cluster, one of the plurality of wing parts has a length defined from the radially inward end of the wing part to the radially outward end of the wing part, and the length of the wing part is equal to or greater than a minimum length defined from an outer peripheral surface of the fuel conduit to the inner peripheral surface of the main tube.

6. The combustor nozzle according to claim 1, wherein, for each of the at least one cluster, each of the plurality of wing parts has a height in the axial direction that is smaller than the axial height of the main tube in the axial direction.

7. The combustor nozzle according to claim 1, wherein, for each of the at least one cluster, the fuel conduit of the fuel supply part is positioned at a center of the main tube.

8. The combustor nozzle according to claim 1, wherein, for each of the at least one cluster, the main tube comprises an inlet and an outlet, the air and the fuel enter the main tube via the inlet and exit the main tube via the outlet, and each of the plurality of wing parts is located closer to the outlet of the main tube than the inlet of the main tube.

9. The combustor nozzle according to claim 1, wherein, for each of the at least one cluster, the main tube comprises an inlet and an outlet, the air and the fuel enter the main tube via the inlet and exit the main tube via the outlet, and each of the plurality of wing parts is located closer to the inlet of the main tube than the outlet of the main tube.

10. A gas turbine comprising:
a compressor configured to compress air introduced from an outside;
a combustor configured to mix fuel with the compressed air compressed by the compressor for combustion; and
a turbine having a plurality of turbine blades rotated by combustion gas produced by the combustion in the combustor,
wherein the combustor comprises a combustor nozzle comprising at least one cluster composed of a plurality of tubes, and
wherein each of the at least one cluster comprises:
a main tube, from among the plurality of tubes, through which the compressed air and the fuel flow, the main tube having an axial height and defining an axial direction from upstream to downstream according to a flow direction of the compressed air and the fuel through the main tube;
a plurality of sub-tubes, from among the plurality of tubes, arranged with a circumferential pattern to form a circumference, wherein the main tube is located at a center of the circumference;
a fuel supply part including a fuel conduit extending parallel to the axial direction and a plurality of wing parts radially protruding from the fuel conduit;

wherein, for each of the at least one cluster, at least a portion of the fuel conduit is positioned inside the main tube to supply the fuel, wherein a total count of the fuel supply part in the each of the at least one cluster is one, wherein, for each of the at least one cluster, each of the plurality of wing parts has a radially inward end that is coupled to the fuel conduit and a radially outward end that is in contact with an inner peripheral surface of the main tube, wherein, for each of the at least one cluster, each of the plurality of wing parts has an upstream half portion and a downstream half portion, wherein, for each of the plurality of wing parts in each of the at least one cluster, an upstream end corner of the upstream half portion and a downstream end corner of the downstream half portion are formed round, wherein, for each of the plurality of wing parts in each of the at least one cluster, a thickness of the upstream half portion is defined in a circumferential direction about the fuel conduit and comprises a first maximum thickness T1, and the first maximum thickness T1 remains constant for a height of the upstream half portion in the axial direction, wherein, for each of the plurality of wing parts in each of the at least one cluster, a thickness of the downstream half portion is defined in the circumferential direction and the thickness gradually increases from upstream to downstream over a height of the downstream half portion in the axial direction, such that a concavely curved surface is formed on an outer circumferentially facing surface of the downstream half portion, wherein, for each of the plurality of wing parts in each of the at least one cluster, the first maximum thickness T1 of the upstream half portion occurs at a first axial location P1, the thickness of the downstream half portion comprises a second maximum thickness T2 at a second axial location P2, and the first maximum thickness T1 is smaller than the second maximum thickness T2, such that, at the first axial location P1, the radially inward end of each wing part of the plurality of wing parts is spaced apart in the circumferential direction from the radially inward end of an adjacent wing part of the plurality of wing parts, and at the second axial location P2, the radially inward end of each wing part of the plurality of wing parts is in contact with the radially inward end of the adjacent wing part of the plurality of wing parts in the circumferential direction.

11. The combustor nozzle according to claim 10, wherein, for each of the at least one cluster, at the first axial location P1, the radially inward end of each of the plurality of wing parts is spaced apart from the radially inward end of the adjacent wing part of the plurality of wing parts with a same angle in the circumferential direction around the fuel conduit.

12. The combustor nozzle according to claim 11, wherein, for each of the at least one cluster, the plurality of wing parts are four or five in number.

13. The combustor nozzle according to claim 10, wherein, for each of the at least one cluster, each of the plurality of wing parts has a same length from the radially inward end to the radially outward end.

14. The combustor nozzle according to claim 10, wherein, for each of the at least one cluster, one of the plurality of wing parts has a length defined from the radially inward end of the wing part to the radially outward end of the wing part, and the length of the wing part is equal to or greater than a minimum length defined from an outer peripheral surface of the fuel conduit to the inner peripheral surface of the main tube.

15. The combustor nozzle according to claim 10, wherein, for each of the at least one cluster, each of the plurality of wing parts has a height in the axial direction that is smaller than the axial height of the main tube in the axial direction.

16. The combustor nozzle according to claim 10, wherein, for each of the at least one cluster, the fuel conduit of the fuel supply part is positioned at a center of the main tube.

17. The combustor nozzle according to claim 10, wherein, for each of the at least one cluster, the main tube comprises an inlet and an outlet, the compressed air and the fuel enter the main tube via the inlet and exit the main tube via the outlet, and each of the plurality of wing parts is located closer to the outlet of the main tube than the inlet of the main tube.

18. The combustor nozzle according to claim 10, wherein, for each of the at least one cluster, the main tube comprises an inlet and an outlet, the compressed air and the fuel enter the main tube via the inlet and exit the main tube via the outlet, and each of the plurality of wing parts is located closer to the inlet of the main tube than the outlet of the main tube.

* * * * *